United States Patent Office 3,338,865
Patented Aug. 29, 1967

3,338,865
STABILIZATION OF PLASTICS BY MEANS OF A
1,2,4-THIADIAZOLIDINE-3,5-DITHIONE
Adam F. Kopacki, Westwood, N.J., assignor to Stauffer Chemical Company, New York, N.Y., a corporation of Delaware
No Drawing. Filed Mar. 9, 1965, Ser. No. 438,375
7 Claims. (Cl. 260—45.8)

ABSTRACT OF THE DISCLOSURE

Polyolefin compositions protected against photo-degradation from exposure to actinic radiation comprising a polyolefin formed from the polymerization of an olefinic aliphatic hydrocarbon having from 2 to 10 carbon atoms and a protective quantity of a 2,4-disubstituted 1,2,4-thiadiazolidine-3,5-dithione of the formula:

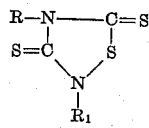

wherein R and $R_1$ represent relatively inert non-interfering hydrocarbon substituents selected from the class consisting of aliphatic of from 1 to 18 carbon atoms and aryl of from 6 to 12 carbon atoms.

---

This invention relates to the protection and stabilization of plastics and polymeric materials against degradation from exposure to actinic radiation. The invention is particularly concerned with the stabilization of polyolefins from the adverse effects of exposure to light and ultraviolet radiation.

It is well known that many materials such as plastics and synthetic resins and in fact organic polymeric substances generally are subject to deterioration in the presence of actinic radiation. The effect is so pronounced with some classes of polymers that structural members manufactured therefrom cannot be used in outdoor construction due to mechanical weakening and deterioration caused by exposure to sunlight. An especially radiation-sensitive group of polymers are the isotactic polyolefins. A typical representative of this series, polypropylene, is rapidly degraded in the presence of light and/or ultraviolet radiation. The breakdown of the polymer is apparently a photo-oxidation process which causes scission of the polymer chains with concomitant formation of carbonyl functions. In fact, prolonged exposure reduces the polymer to a powdery mass, often accompanied by excessive discoloration or darkening.

It is also well known that the photocatalyzed degradation of organic plastic materials can be considerably retarded by incorporating in the plastic certain chemical additives. The protective action afforded by such additives resides in their unusual efficiency as absorbers of ultraviolet light which is the spectral range particularly harmful to organic polymers. As a consequence the greater proportion of the detrimental radiation is taken up by the additive thereby leaving the plastic substrate relatively unscathed. Generally speaking, the region of the spectrum causing maximum degradation for most plastics lies between 300–400μ. The ideal absorber exhibits peak absorption at the wave lengths where the particular plastic is most susceptible to breakdown. Although the principal requirement of an ultraviolet absorber is that it provides the proper spectral response, other ancillary properties are also necessary in practice. These include light stability, heat stability, low color compatibility and low volatility. A desideratum from the commercial standpoint is low manufacturing costs. Because of such narrow and stringent specifications, it is not too surprising that very few materials have achieved practical significance.

It has now been discovered that the aforenamed list of parameters for an ultraviolet absorber can be essentially realized in a class of heterocyclic compounds known chemically as 1,2,4-thiadiazolidine-3,5-dithiones and the stabilization of polymers and plastic materials by the use of such compounds constitutes the principal purpose and object of this invention. It is an equally important object of the invention to provide polymeric compositions stabilized by means of the aforesaid compounds. Other objects and purposes will become manifest as the description proceeds.

In accordance with the present invention, we have succeeded in stabilizing polymers and plastics from the damaging effects of actinic radiation, principally ultraviolet light and visible light, by incorporating therein certain ultraviolet absorbing 1,2,4-thiadiazolidine-3,5-dithiones of the following formula:

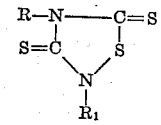

wherein R and $R_1$ represent inert or non-interfering hydrocarbon groups i.e., R and $R_1$ should not react with the polymer substrate or any of the various additives or modifiers contained therein such as plasticizers, antioxidants, pigments, heat stabilizers and the like. Nor should R and $R_1$ cause any significant change in the absorption characteristics of the basic 1,2,4-thiadiazolidine-3,5-dithione configuration which falls in the desirable range of 390–400μ and in this connection it has been ascertained that R and $R_1$ should be free of color producing or color intensifying substituents commonly referred to as chromophores and auxochromes. R and $R_1$ are preferably a saturated hydrocarbon residue of from 1 to 18 carbon atoms or an aromatic hydrocarbon residue of from 6 to 12 carbon atoms. Typically, R and $R_1$ can be alkyl of from 1 to 18 carbon atoms, e.g. methyl, ethyl, n-propyl, n-butyl, isobutyl, n-pentyl, isopentyl, sec.-pentyl, n-hexyl, isohexyl, n-heptyl, isooctyl, n-octyl, n-nonyl, isononyl, n-decyl, isodecyl, n-undecyl, n-dodecyl, n-tridecyl, n-tetradecyl, pentadecyl, hexadecyl, heptadecyl, octadecyl, etc.; aralkyl e.g. benzyl, phenethyl, γ-phenylpropyl, etc.; cycloalkyl e.g. cyclopropyl, cyclobutyl, cyclopentyl, cylcohexyl, cyclodecyl, cyclotetradecyl, cyclooctadecyl, etc.; aryl of from 6 to 12 carbon atoms, e.g. phenyl, alkylphenyl, e.g. o-tolyl, n-tolyl, p-tolyl, p-ethylphenyl, 2,4-diisooctylphenyl, etc.; biphenylyl, α-naphthyl, β-naphthyl,acenaphthenyl and the like.

1,2,4 - thiadiazolidine - 3,5 - dithiones are well known chemical entities, the description and preparation of which are detailed in the chemical literature and in this connection reference is made to Freund et al. Ann. 285, 175 (1895). According to the Freund et al. procedure an N-substituted alkali metal carbamate is oxidatively coupled using iodine as the oxidizing agent and the resulting disulfide derivative treated with bromine to form a 3-imino-1,2,4-dithiazolidine-5-thione which is then isomerized into the desired 1,2,4-thiazolidine-3,5-dithione. The reaction can be visualized by means of the following chemical equations:

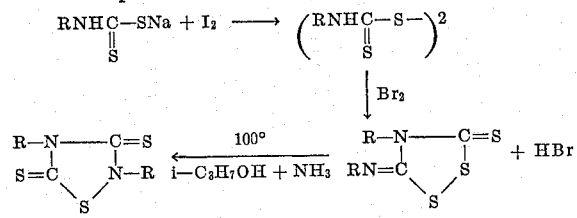

In practicing the invention the 1,2,4-thiadiazolidine-3,5-dithiones can be blended or incorporated into the polymer by any of the conventional methods commonly used for mixing such materials with resins and plastics. A typical procedure comprises milling on a heated roller although deposition from solvents and dry blending are other well known techniques. The compatability of the additive with the particular polymeric substrate can be modified and controlled by the appropriate selection of hydrocarbon substituents affixed to the 1,2,4-thiadiazolidine nucleus. In this connection those skilled in the art will realize that compatability in the non-polar polymers such as hydrocarbon polymers is facilitated by employing an additive in which the substituents are rather high molecular weight and/or branched hydrocarbon groups whereas compatability in the more polar polymers is facilitated by selecting substituents which each contain only a few carbon atoms. Where the additive exhibits low solubility or compatability with a particular plastic substrate the efficiency of the 1,2,4-thiadiazolidine 3,5-dione derivative can be realized by employing it in the form of a finely divided or colloidal dispersion. However as above pointed out in most instances the compatability of the additive can be realized by proper choice of the hydrocarbon substituents on the 1,2,4-thiadiazolidine-3,5-dithione ring system.

In testing the stabilizers of the invention we have found them singularly effective in protecting the polyolefin system of polymers including diolefins, copolymers of olefins and diolefins. The polymer compositions as stabilized in accordance with the invention exhibit an extended life expectancy and are much more useful and practical than unstabilized polymers and possess a wide diversity of uses including out-of-door installations requiring extended exposure to sunlight and the elements. Moreover the 1,2,4-thiadiazolidine 3,5-dithiones, although inordinately effective as UV stabilizers are remarkably innocous in many of the polymeric systems in which they were tested. For example we have exposed samples of polyolefins to ultra violet light for a period in excess of 1000 hours without significant stain or discoloration and at the same time no appreciable loss of mechanical strength of the polymer occurred.

The polymers stabilized as contemplated herein can be cast, extruded, rolled or molded into sheets, rods, tubes, piping, filaments and other shaped articles, including sheets or films ranging from 0.5 to 100 mils in thickness. The polymer compositions of my invention can be applied as coatings to paper, cloth, wire, metal foil and are suitable for the manufacture of synthetic fibers and fabrics. Although the quantity of stabilizer is not particularly critical, it is recommended that the concentration based on the weight of the polymer be maintained in the neighborhood of 0.01 to about 5.0%.

The 1,2,4-thiadiazolidine-3,5-dithione derivatives as described herein are suitable for stabilizing a wide variety of solid polymer compositions against deterioration brought on by exposure to actinic radiation. In this connection mention is made of any of the normally solid polymers derived from the polymerization of $\alpha$-mono-olefinic aliphatic and aryl-substituted aliphatic hydrocarbons containing from two to ten carbon atoms. Typical poly-$\alpha$-olefins include polyethylene, polypropylene, poly-(3-methylbutene-1), poly(4-methylpentene-1), poly(pentene-1), poly(3,3-dimethylbutene-1), poly(4,4-dimethylbutene-1), poly(octene-1), poly(decene-1), polystyrene and the like. Copolymers of such olefins as those prepared from ethylene and propylene or ethylene and the butenes or the like are also protected as are polydiolefins, i.e. polybutadiene or polyisoprene and olefin-diolefin copolymers of the type as butadiene-styrene or isobutylene-isoprene copolymers. Polymeric materials prepared from olefins and/or diolefins containing some vinylic monomers such as acrylonitrile or vinyl chloride as illustrated by the so-called ABS resins, acyrlonitrile, butadiene and styrene terpolymers, are considered to be within the scope of this invention as are polymers of substituted vinyl monomers such as vinyl chloride, vinylidene dichloride, vinyl acetate, acrylonitrile and the like. Polyester resins with and without added styrene, divinylbenzene and the like are also stabilized by means of the 1,2,4-thiadiazolidene-3,5-dithione derivatives.

We have ascertained that the stabilizers of the invention are particularly useful for preventing photodegradation by ultraviolet light or sunlight of stereoregular polyolefins such as isotactic polypropylene. Isotactic polypropylene is a stereoregular polymer wherein the monomeric units are linked predominantly head to tail with the methyl group on one side of the helical chain rather than the more common arrangement with methyl groups randomly distributed on both sides of the chain. Moreover, this isotactic or singular arrangement of substituents attached to the chain promotes an orderly alignment of the molecules. Such stereoregular polymers often exhibit a high degree of crystallinity and are much superior in physical properties to atactic polymers having a random distribution of monomeric units. Stereoblock polymers wherein long segments of the chain are in one configuration or the other and also polymers with amorphous regions are also protected. For a fuller description of such polymers, reference is made to the Scientific American, 197 No. 3, pages 98–104 (1957); 205 No. 2, pages 33–41 (1961). Amorphous or appreciably amorphous polymers are also stabilized.

Although the molecular weight of polymers varies over wide limits, the stabilizer compounds of the invention are not restricted to any particular molecular weight range of polymer, and in fact it has been our finding that excellent protection can be realized with polymers having a broad or narrow range. Moreover, the so-called amorphous low molecular weight poly-$\alpha$-olefin waxes or oils are likewise susceptible to stabilization by means of the compounds of the invention.

Polyesters which can be protected against ultra-violet radiation by means of the 1,2,4-thiadiazolidine-3,5-dithione derivatives are well known chemical entities and are described at length in the technical literature and numerous U.S. patents. One type of polyester is derived from the addition polymerization of ethylenically unsaturated organic esters, particularly vinyl ester monomers, and in this connection mention is made of acrylic esters, vinyl esters and in general any organic ester containing a

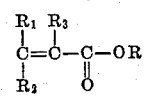

configuration wherein R, $R_1$, $R_2$ and $R_3$ represent hydrogen or an organic hydrocarbyl substituent. The polymerization is commonly effectuated by contacting the monomer with a polymerization initiator such as an organic peroxide with or without the application of heat.

Another type of polyester which can be stabilized in accordance with the invention is formed by the successive esterification of dicarboxylic acids with polyglycols. The resulting polymeric ester consists of alternate linkages of the dicarboxylic acid and polyglycol residues produced by the elimination of water from between the reactants.

The resulting polymers may be linear or cross-linked depending on the selection of the components. For instance, a diglycol wherein the hydroxyl groups are terminally situated produce a linear type of polyester whereas such polyglycols as exemplified by glycerol give rise to a cross-linked polymer such as the well known polymers formed by reacting glycerol with the dicarboxylic acid, phthalic acid, in the form of its anhydride.

Modifications of polyesters are the well known alkyd resins which are obtained by forming a polyester by reacting a polyglycol and an alpha-beta-ethylenically unsaturated di- or polycarboxylic acid and cross-linking the residual ethylene double bonds with a suitable cross-linking agent.

In a more specific and detailed sense, the alkyd resins as above referred to having a plurality of polymerizable alpha-beta-ethylenically unsaturated linkages may be produced by combining together a polyhydric alcohol with a polycarboxylic acid or its anhydride which contains alpha-beta-ethylenic unsaturation. It is generally understood that the acid or its anhydride includes the designation polycarboxylic acid and such terminology will be understood in the description as herein set forth. Saturated carboxylic acids are also frequently included in the reaction mixture for the purpose of modifying the properties of the resin. From the standpoint of costs, the unsaturated polycarboxylic acids most commonly utilized are maleic, usually in the form of the anhydride, and fumaric acid. Other alpha-beta-unsaturated carboxylic acids which may be employed are exemplified by citraconic, itaconic, aconitic and mesaconic acids. The chemical and technical literature can be consulted for the names of other suitable acids. An acid often used for modifying the properties of a polyester resin is phthalic acid, commonly in the form of its anhydride. Other such acids with benzonoid or aromatic unsaturation which behave as saturated acids in that their benzonoid unsaturated structure does not enter into any common ethylenic type polymerization are commonly selected to produce various and particular properties and effects in the alkyd resin. In this connection, reference is made to such acids as isophthalic, adipic, azelaic, tetrachlorophthalic acid, sebacic, suberic, endomethylenetetrahydrophthalic and hexachloroendomethylenetetrahydrophthalic.

As illustrative of the polyhydric alcohols applicable for the synthesis of alkyd resins, mention is made of ethylene glycol, diethylene glycol, propylene glycols, dipropylene glycol, butylene glycol and the like. Here again, the literature may be consulted for the names of the less common polyglycols. It should be pointed out that as with the dicarboxylic acid, a polyglycol alcohol may be selected which is ethylenically unsaturated and thereby giving residual ethylenic double bonds for the purpose of cross-linking the polyester with concomitant modification in physical and chemical properties.

In preparing an alkyd resin, the polycarboxylic acid and appropriate polyhydric alcohol are commonly reacted at elevated temperatures in the presence of an inert atmosphere. The reaction is normally carried out at a temperature ranging from about 150° C. to about 230° C.; the inert atmosphere is conveniently provided by carbon dioxide or nitrogen gas. Generally, the total number of moles of alcohol exceeds the total number of moles of acid by about 5 to 20% since the latter figures are required to effect complete esterification, although the proportions are not critical. A relatively inert organic solvent such as xylene is sometimes useful in carrying out the reaction. Since the reaction is an esterification, water is given off and should be removed from the system. After essentially all of the water has been expelled, any solvent is removed and after the mixture cools, the appropriate unsaturated monomeric cross-linking agent added. If cross-polymerization or linkage is to be prolonged, the presence of a suitable inhibitor is necessary.

Unsaturated monomers suitable for use as cross-linking agents can be selected from a wide variety of polymerizable compounds characterized by the presence of a $CH_2=CH-$ group. Examples of such monomers are syrene, vinyltoluene, methylacrylate, divinylbenzene, diallylphthalate, dimethylstyrene, methylmethacrylate, vinylacetate, butadiene, and the like. It is also a common practice to employ special monomers in order to secure particular effects. In this connection, mention is made of triallylcyanurate useful in imparting high heat resistance to resins, alkylallyldiglycolate for use as a refractive modifier, while diallylphenylphosphonate has been employed to impart fire resistance.

Three groups of components which we have found particularly suitable and convenient for preparing polyesters are: (1) acids such as maleic, fumaric, itaconic, phthalic and the like; (2) alcohols or glycols such as allyl alcohol, ethylene glycol and diethylene glycol; (3) unsaturated hydrocarbons such as styrene, cyclopentadiene and the like. For example, the polyesters disclosed in United States Patent No. 2,255,313 are illustrative of these unsaturated polyesters. Certain commercial polyesters also form satisfactory copolymers. Also polyesters such as generally described in United States Patent No. 2,443,736, containing an alkenyl aryl cross-linking agent, such as diallyl phthalate, and the reaction product of an alpha,beta ethylenically unsaturated polycarboxylic acid, such as maleic or fumaric acid, a saturated polycarboxylic acid free of non-benzoid unsaturation, such as phthalic acid, and at least one glycol, such as ethylene glycol and/or diethylene glycol.

The amounts of the components useful in preparing polyesters may vary widely. In most instances, approximately two parts by weight of an unsaturated alkyd resin to one part by weight of the monomeric cross-linking agent is suitable although as above mentioned, the proportions may be varied over wide limits.

Another important polymer which can be stabilized in accordance with the invention is polyvinylchloride. This polymer is commonly produced by the emulsion polymerization using a redox initiator for polymerizing vinyl chloride. One type of polyvinylchloride is the so-called rigid or unplasticized polyvinylchloride and this particular modification of polyvinylchloride can be effectively stabilized by the compounds of the invention. As has previously been pointed out elsewhere herein, the 1,2,4-thiadiazolidine-3,5-dithiones are effective as stabilizers either for the polymers themselves or various copolymers and terpolymers and mixtures thereof. One class of polymer compositions which lends itself to stabilization by means of the compounds of the invention is resin mixtures which are blends or copolymers of a plastic such as polystyrene or styreneacrylonitrile copolymer with a rubber usually a butadieneacrylonitrile copolymer. Such compositions may be intimate physical mixtures of the two components, the so-called polyblends or a true terpolymer, that is, an ABS resin, possibly produced by block or graft techniques. An example of the latter case is a graft copolymer of styrene or nitrile rubber. Typical compositions include 20–30% acrylonitrile, 20–30% butadine and 40–60% styrene. The abbreviation ABS is taken from the initial letters of the three monomers.

For a more detailed description of the various polymers, copolymers and terpolymers which are susceptible to stabilization in accordance with the invention, they are described at great length in the technical and chemical publications. In this connection, reference is made to such well-known treatises as "Polyester Resins" by J. R. Lawrence, Reinhold Publication Corp., New York (1960) and "Textbook of Polymer Science" by F. W. Billmeyer, published by Interscience Publishers, New York (1962).

The following examples illustrate the procedure for preparing stabilized polymer compositions of the invention although the inclusion of such examples is not to be taken as limiting or otherwise imposing any restriction on the invention, and it is to be understood that variations in practicing the same without departing from the scope or spirit thereof will be apparent to those skilled in the art to which the said invention pertains.

*Example 1*

A dry blend consisting of 0.5% by weight of 2,4-dimethyl 1,2,4-thiadiazolidine-3,5-dithione and 50 g. of isotactic polypropylene was subjected to compression molding in the usual manner at a temperature of 400° F. for six minutes at 2000 p.s.i. The blended polymer was compression molded or extruded into a 25 mil sheet and thereafter cut into square samples measuring 2 inches on the side. A like sample containing no stabilizer was also prepared and tested. The samples were then exposed in a Xenon Arc Weatherometer operating at 6000 watts. The water cycle was adjusted whereby each sample was subjected to 18 minutes of water spray and 102 minutes of dry exposure for each two hours of exposure. Exposure damage to the samples of polypropylene was assessed with respect to change of structural strength.

After a period of exposure in excess of 1000 hours, the test sheet of polypropylene showed no signs of brittleness to 180° flexure test. Nor was there any evidence at this time of any surface crazing or any coloration or staining. A blank specimen of unstabilized polypropylene which was exposed concurrently with the stabilized product failed the flexure test after 250 to 300 hours exposure time.

The Weatherometer as used in compiling the data and tests described herein was purchased from the Atlas Electric Devices Company, Chicago, Ill. The instrument is identified as a 6000 Watt Xenon Arc Weatherometer Model 60 W.

The polypropylene resin as used in the above described example is an unstabilized general purpose, high molecular weight polypropylene of the isotactic or crystalline type. Typically, it has a melt index of 4 at 230° C. and a specific gravity of 0.905.

*Example 2*

The procedure of Example 1 is repeated but substituting polyethylene in lieu of polypropylene. In general, the results parallel those obtained in the first example.

I claim:
1. A polyolefin composition protected against photodegradation from exposure to actinic radiation comprising a polyolefin formed from the polymerization of an olefinic aliphatic hydrocarbon having from 2 to 10 carbon atoms and a protective quantity of a 2,4-disubstituted 1,2,4-thiadiazolidine-3,5-dithione of the formula:

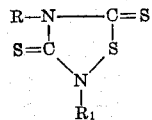

wherein R and $R_1$ represent relatively inert non-interfering hydrocarbon substituents selected from the class consisting of aliphatic of from 1 to 18 carbon atoms and aryl of from 6 to 12 carbon atoms.

2. A polyolefin composition comprising a polyolefin formed from the polymerization of an olefinc aliphatic hydrocarbon having from 2 to 10 carbon atoms and from about 0.01% to about 5.0% based on the polyolefin of a 2,4-disubstituted 1,2,4-thiadiazolidine-3,5-dithione of the formula

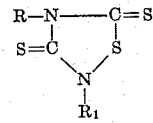

wherein R and $R_1$ represent relatively inert non-interfering hydrocarbon substituents selected from the class consisting of aliphatic of from 1 to 18 carbon atoms and aryl of from 6 to 12 carbon atoms.

3. The composition according to claim 2 wherein the polyolefin is polypropylene.

4. The composition according to claim 2 wherein the polyolefin is polyethylene.

5. The composition according to claim 2 wherein the 1,2,4-thiadiazolidine-3,5-dithione is substituted in the 2 and 4 positions with alkyl of from 1 to 18 carbon atoms.

6. A polyolefin composition comprising isotactic polypropylene and about 0.01% to about 5.0% based on the weight of the polypropylene of 2,4-dimethyl-1,2,4-thiadiazolidine-3,5-dithione.

7. A polyolefin composition comprising isotactic polypropylene and 0.5% based on the weight of the polypropylene of 2,4 - dimethyl - 1,2,4 - thiadiazolidine-3,5-dithione.

References Cited

UNITED STATES PATENTS 3,238,176   3/1966   Brooks _____ 260—45.8

DONALD E. CZAJA, *Primary Examiner.*

W. J. WELSH, *Assistant Examiner.*